United States Patent [19]  
Goldman

[11] 4,443,585  
[45] Apr. 17, 1984

[54] DIENE/ACRYLATE BASED IMPACT MODIFIER FOR PVC

[75] Inventor: Theodore D. Goldman, Washington's Crossing, Pa.

[73] Assignee: Rohm and Haas Company, Philadelphia, Pa.

[21] Appl. No.: 502,904

[22] Filed: Jul. 12, 1983

Related U.S. Application Data

[63] Continuation of Ser. No. 332,431, Dec. 21, 1981, abandoned.

[51] Int. Cl.³ .......................................... C08F 279/02
[52] U.S. Cl. ................................. 525/310; 525/83; 525/902
[58] Field of Search ............... 525/83, 310, 902, 84, 525/309; 524/458, 461, 533

[56] References Cited

U.S. PATENT DOCUMENTS 4,078,018 3/1978 Chauvel ............................. 525/83

Primary Examiner—Paul R. Michl  
Attorney, Agent, or Firm—Marc S. Adler

[57] ABSTRACT

Impact modifiers having high efficiency at low levels and at low temperatures comprising at least three stages, Stage A being a non-crosslinked polymer of at least 70% butadiene and at least 10% lower alkyl ($C_2$–$C_8$) acrylate, Stage B being a polymer of at least 80% styrene, and Stage C containing at least 50% methyl methacrylate and at least 1% alkyl ($C_1$–$C_4$) acrylate, the ratio of Stages A:B:C, excluding optional additional stages, being about 70–85:10–15:10–20, the ratio of stages C:B being at least 1, and Stage A being non-agglomerated are disclosed. Also disclosed are methods of preparing the impact modifier and thermoplastic polymer compositions containing the impact modifier.

10 Claims, No Drawings

DIENE/ACRYLATE BASED IMPACT MODIFIER FOR PVC

This is a continuation of application Ser. No. 332,431, filed Dec. 21, 1981, now abandoned.

BACKGROUND OF THE INVENTION

1. Field of the Invention

This invention relates to polymeric impact modifiers useful especially for PVC, to impact modified thermoplastics such as polyvinyl chloride (PVC), and to a process for preparing such modifiers.

2. Description of the Prior Art

U.S. Pat. No. 4,078,018 to Rhone-Progil teaches PVC impact modifier graft polymers having a butadiene-alkyl acrylate backbone polymer which is agglomerated. "This agglomeration operation consists of enlarging a certain quantity of particles by processes different from polymerization," according to the Rhone-Progil patent. The acrylic monomer and styrene monomer are successively grafted onto the backbone polymer in aqueous emulsion.

U.S. Pat. No. 3,842,144 to Kureha teaches PVC impact modifiers obtained by graft polymerizing upon a cross-linked butadiene-styrene rubber latex a first and then a second grafting component in a sequential two stage process.

U.S. Pat. No. 3,644,250 to Mitsubishi Rayon teaches PVC impact modifiers produced by grafting first styrene and then methyl methacrylate onto an elastomer of butadiene/n-butyl acrylate/styrene.

U.S. Pat. No. 4,173,596 to B. F. Goodrich teaches a seed polymer of cross-linked poly(n-butylacrylate), an intermediate layer derived from a monomer mixture containing n-butyl acrylate and an additional monomer, and an outer shell derived from a monomer mixture containing styrene and methyl methacrylate.

U.S. Pat. No. 3,264,373 to Union Carbide teaches low butadiene level impact modifiers for PVC, having up to 20% butadiene, preferably up to 12%, and the balance alkyl acrylate in the rubber stage, and a second stage free of styrene.

British Pat. No. 1,251,403 teaches impact modifier polymers having a butadiene based trunk polymer containing at least 60% butadiene and grafting polymers of first methyl methacrylate and cross-linking monomers then styrene, then methyl methacrylate and optional crosslinking monomer.

SUMMARY OF THE INVENTION

Each of the impact modifier polymers of the prior art suffers from one or more deficiencies. For example, the modifiers prepared in accordance with the Rhone-Progil teachings may suffer destruction during processing in PVC, and have insufficient impact efficiency.

It is an object of the present invention to provide impact modifiers of superior performance in PVC.

It is a further object to provide an impact modifier having high efficiency at low levels and at low temperatures.

Another object is to provide improved impact modified PVC compositions. Also an object is to provide an improved process for producing impact modifiers using fast polymerization cycle times and relatively low pressure polymerization equipment.

These objects, and others which will become apparent from the following disclosure, are achieved by the present invention which comprises an impact modifier of at least three stages, Stage A having at least 70% butadiene and at least 10% $C_2$ to $C_8$ alkyl acrylate, Stage B having at least 80% styrene, Stage C having at least 50% methyl methacrylate and at least 1% $C_1$ to $C_4$ alkyl acrylate, Stage A being non-agglomerated and comprising about 70% to 85% of the modifier, and the ratio of Stage C to Stage B being at least 1.

In another aspect, the invention comprises PVC containing at least 1% of said impact modifier.

The invention also comprises a process for preparing said impact modifier comprising successively coating a non-crosslinked, non-agglomerated diene/acrylate copolymer core with styrene and then with methyl methacrylate.

DETAILED DESCRIPTION OF THE INVENTION AND THE PREFERRED EMBODIMENTS

The PVC impact modifiers of the invention unexpectedly possess superior impact efficiency at relatively low levels of butadiene in the core. Lowering of butadiene content is advantageous from the standpoint of reduction of polymerization cycle time and the use of lower pressure polymerization equipment. These modifiers have high efficiency at low levels and low temperatures and comprise at least three stages—A, B, and C, with optional additional stages preceeding Stage A, between the stages, or after Stage C.

Stage A is a non-crosslinked polymer of at least about 70% butadiene and at least 10% alkyl ($C_2$–$C_8$) acrylate. Such acrylates are for example butyl, hexyl, or octyl acrylate. It is important that Stage A be non-agglomerated and non-crosslinked. By non-crosslinked is meant not having cross-linking monomers such as divinyl benzene and the like. Stage B, polymerized in the presence of Stage A, is a polymer of at least about 80% styrene. Stage C, polymerized in the presence of Stage B, is a polymer of at least about 50% methyl methacrylate and at least about 1% alkyl ($C_1$–$C_4$) acrylate. Such acrylate can be methyl, ethyl, propyl (n- or iso-), or (n- or iso-) butyl acrylate.

The ratio of Stages A:B:C, excluding optional additional stages, is 70–85:10–15:10–20.

While it is preferred that there be no additional stages than A, B, and C, additional stages containing any of the aforementioned monomers, or even other ethylenically unsaturated monomers, can be present, but should not constitute more than about 25% of the entire modifier. Stages A, B, and C can contain other monomers, also selected from styrene, other alkyl acrylates and methacrylates, vinyl esters, acrylonitrile, and except in the case of Stage A, crosslinking monomers selected from divinyl benzene, diacrylates and dimethacrylates such as ethylene glycol dimethacrylate, butylene glycol diacrylate, and allyl methacrylate.

The impact modifier is prepared by gradually feeding the monomers of Stage A into a reactor either simultaneously or batchwise in such manner as to yield a uniform particle size in the desired range. The particles are grown to the desired particle size, preferably about 1500 to 200 Å, rather than to some smaller size with subsequent agglomeration. Subsequent stages are polymerized in the presence of preferred Stage A under conditions such as soap concentration so that the locus of polymerization is at the surface of the previously formed particles.

1 part of potassium chloride 120 parts of deionized water
3 parts of potassium laurate
0.2 parts of n-dodecyl mercaptan
0.3 parts of potassium persulfate The reaction mixture is heated to 75° C. and kept at this temperature for 8 hours. The conversion is 95%.

The agglomeration is performed as follows: To the latex obtained above, there is added 0.006 parts of polyethylene glycol, having a molecular mass of 20,000, in aqueous solution at 0.5 g/l. The mixture is heated to 80° C. for 5 min. and then cooled.

STAGE B

The materials used are:
50 parts Bd/BA polymer (in the form of the agglomerated latex generated above)
170 parts deionized water
0.5 parts potassium persulfate in 10 parts of deionized water
25 parts methyl methacrylate (MMA)

The agitated reaction mixture is heated to and maintained at 80° C. Following addition of the potassium persulfate solution, the MMA is added continuously over 2 hours. The mixture is held for another 2 hours.

STAGE C

The materials used are:
75 parts of Bd/BA/MMA (in the form of the latex generated above)
25 parts styrene To the reaction mixture agitated at 80° C., the styrene is added over 2 hours. The reaction mixture is held for 2 hours. Following this, a stabilizer based on BHT (1.47 parts) is added.

The impact modifier is incorporated in thermoplastics such as PVC by conventional compounding methods, and in amounts of about 1 to 25% by weight, preferably about 3 to 15%.

The following examples are presented to illustrate a few non-limiting embodiments of the invention.

EXAMPLES

EXAMPLE 1

Preparation of Impact Modifier

A. Preparation of butadiene-butyl acrylate polymer—Stage A

The materials are:
77 parts of butadiene
23 parts of butyl acrylate
4 parts of methyl methacrylate
3 parts of butadiene/styrene seed polymer
0.05 parts of acetic acid
1.7 parts of sodium lauryl sulphate (SLS)
0.03 parts of sodium chloride
0.6 parts cumene hydroperoxide (CHP)
0.3 parts sodium formaldehyde sulfoxylate (SFS)
95 parts of deionized water The deionized water, acid, seed polymer, and portions of the SLS, CHP, and SFS, are charged into stainless steel high pressure reactor. At a temperature of 80° C., a 4 hour gradual feed of the monomers (except MMA) is begun. The remaining materials (except the MMA and a small portion of the CHP) are added either gradually or shot wise during the 4 hour period. The reaction temperature will exotherm to 95° C. After the completion of the 4 hour period, the monomer conversion is at least 85%. The MMA and remaining CHP are then fed during 3 hours while the reaction mixture is cooled to 65° C. The conversion at the end is at least 95%.

B. Preparation of the Grafted Polymer—Stage B

The materials used are:
70 parts of Bd/BA polymer (in the form of the latex generated above)
13.5 parts of styrene
3.3 parts of deionized water
0.1 parts of CHP
0.05 parts of SFS The styrene, deionized water, and SFS are added to the 30° C. agitated reaction mixture. The CHP is then added in shots over 75 min. The reaction mixture is then held for 1 hour.

C. Stage C

The materials used are:
83.5 parts of Bd/BA//St polymer (in the form of the latex generated above)
14.9 parts of methyl methacrylate
1.6 parts ethyl acrylate
3.1 parts of deionized water
0.015 parts SFS
0.034 parts CHP After adding the deionized water and SFS, a 1 hour gradual addition of monomer and CHP is begun. After a 0.5 hour hold, additional initiation (0.017 parts t-butyl hydroperoxide and 0.005 parts SFS) is added. Following this, a stabilizer based on butylated hydroxy toluene antioxidant (BHT), 1.40 parts, is added.

The polymer is isolated by spray drying in one case and by coagulation in another.

EXAMPLE 2

Comparative

In this example, the effects of agglomeration of the Stage A rubber are demonstrated so as to distinguish the invention from Rhone-Progil U.S. Pat. No. 4,078,018.

Preparation of the Bd/BA polymer—Stage A

The materials used are:
80 parts of butadiene
20 parts of butyl acrylate

The polymer is isolated by addition of three times the theoretical amount (based on the emulsifier) of a mixture of hydrochloric acid and sodium chloride in 10% aqueous solution. The coagulated product is filtered, washed and dried.

It should be noted that the rubber composition of Example 1 Bd/BA/MMA=74.1/22.1/3.8 varied slightly from that of Example 2, Bd/BA=80/20, following the teachings of the patent. Particle size determinations showed the agglomerated rubber to be 1320 Å (green light)–1630 Å (blue light).

EXAMPLE 3

Evaluation For Impact Efficiency

Samples of PVC formulations containing the impact modifiers prepared in Example 1, in accordance with the invention, and Example 2, in accordance with the Rhone-Progil patent, were molded into standard bars for Izod impact strength testing. For each case 15 phr of modifier were used. In this Izod test, 60 bars of each formulation were tested at each of two temperatures, 10° C. and 0° C. A ductile break shows impact resistance whereas a non-ductile break indicates failure.

In this test the samples containing the modifier of the invention gave 59 ductile breaks at 10° C. and 26 ductile breaks at 0° C., whereas the samples containing the Rhone-Progil modifier gave no ductile breaks at either temperature, proving the unexpected advantage of Stage A being non-agglomerated.

I claim:

1. An impact modifier composition having high efficiency at low levels and at low temperatures comprising a Stage A core polymer and two outer Stage polymers, B and C, said Stage A core polymer being a non-crosslinked, non-agglomerated polymer of at least 70% butadiene and at least 10% alkyl ($C_2$–$C_8$)acrylate, said Stage B polymer being at least 80% styrene, and said Stage C polymer containing at least 50% methyl methacrylate and at least 1% alkyl ($C_1$–$C_4$)acrylate, the ratio of Stages A:B:C being about 70–85:10–15:10–20, and the ratio of Stages C:B being at least 1.

2. An impact modifier composition according to claim 1 wherein the alkyl ($C_1$–$C_4$) acrylate in Stage C is ethyl acrylate.

3. An impact modifier composition according to claim 1 wherein the alkyl acrylate in Stage A is butyl acrylate.

4. An impact modifier composition according to claim 1 further comprising additional stages in addition to Stages A, B, and C, and where said additional stages comprise less than about 25% of the impact modifier.

5. An impact modifier composition according to claim 1 wherein the butadiene:alkyl acrylate ratio in Stage A is 75–95:25–5.

6. An impact modifier composition according to claim 1 further comprising additional monomers in Stages A, B, or C selected from the group consisting of styrene, lower alkyl acrylates, methacrylates, vinyl esters, acrylonitrile, and crosslinking monomers in Stages B or C selected from the group consisting of divinyl benzene, ethylene glycol dimethacrylate, butylene glycol diacrylate, and allyl methacrylate.

7. An impact modifier according to claim 1 wherein Stage A is a copolymer of butadiene and butyl acrylate, Stage B is all styrene, and Stage C is a copolymer of methyl methacrylate and ethyl acrylate.

8. A method of preparing the impact modifier composition of claim 1 comprising feeding the polymerizable monomers of said non-agglomerated, non-crosslinked Stage A core polymer into a reactor to yield a Stage A core polymer of uniform particle size of about 1500 to 2000 Å, and polymerizing said outer Stages B and C in the presence of said previously formed particles of said Stage A core polymer at the surface of the previously formed particles of said Stage A core polymer.

9. A composition comprising a thermoplastic polymer and about 1 to 25% by weight of said impact modifier composition of claim 1.

10. The composition of claim 9 wherein said thermoplastic polymer is PVC.

* * * * *

UNITED STATES PATENT AND TRADEMARK OFFICE
CERTIFICATE OF CORRECTION

PATENT NO. : 4,443,585

DATED : April 17, 1984

INVENTOR(S) : Theodore D. Goldman

It is certified that error appears in the above-identified patent and that said Letters Patent is hereby corrected as shown below:

Column 2, line 62 reads "200Å" should be --2000Å--

Column 2, line 68 beginning with "1 part of potassium chloride" ... up to and including ... (column 3, line 33) "parts) is added." should be moved to column 4, line 43 between "20 parts of butyl acrylate" and "The polymer is isolated by addition of three times the."

Signed and Sealed this

Twenty-eighth Day of August 1984

[SEAL]

Attest:

GERALD J. MOSSINGHOFF

*Attesting Officer*     *Commissioner of Patents and Trademarks*